(12) United States Patent
Muir

(10) Patent No.: US 8,417,787 B1
(45) Date of Patent: Apr. 9, 2013

(54) SYSTEM AND METHOD OF IMPROVING THE DELIVERABILITY OF ELECTRONIC COMMUNICATIONS

(76) Inventor: Brian Muir, Carlsbad, CA (US)

(*) Notice: Subject to any disclaimer, the term of this patent is extended or adjusted under 35 U.S.C. 154(b) by 24 days.

(21) Appl. No.: 13/341,763

(22) Filed: Dec. 30, 2011

(51) Int. Cl.
*G06F 15/16* (2006.01)
(52) U.S. Cl. ......................................... 709/206; 709/207
(58) Field of Classification Search .................. 709/201, 709/202, 203, 206, 204, 205, 207
See application file for complete search history.

(56) References Cited

U.S. PATENT DOCUMENTS

| | | | |
|---|---|---|---|
| 7,685,414 B1* | 3/2010 | Appenzeller et al. ......... 713/150 |
| 2005/0216329 A1* | 9/2005 | Handy-Bosma et al. ....... 705/10 |
| 2007/0011268 A1* | 1/2007 | Banga et al. .................. 709/217 |
| 2007/0192166 A1* | 8/2007 | Van Luchene .................. 705/10 |
| 2009/0327407 A1* | 12/2009 | Gropper ........................ 709/203 |
| 2010/0082652 A1* | 4/2010 | Jones et al. ................... 707/758 |
| 2011/0208822 A1* | 8/2011 | Rathod ........................... 709/206 |
| 2011/0296004 A1* | 12/2011 | Swahar .......................... 709/224 |
| 2012/0042263 A1* | 2/2012 | Rapaport et al. ............... 715/753 |
| 2012/0089681 A1* | 4/2012 | Chowdhury et al. ......... 709/206 |
| 2012/0158851 A1* | 6/2012 | Kelmenson et al. .......... 709/205 |
| 2012/0185538 A1* | 7/2012 | Lee et al. ....................... 709/204 |

* cited by examiner

*Primary Examiner* — Dhairya A Patel
(74) *Attorney, Agent, or Firm* — Manuel de la Cerra

(57) ABSTRACT

Systems and methods are provided for building, maintaining, and scoring lists of electronic communication addresses of users by providing users with ongoing access to protected electronic content in exchange for the users engaging in ongoing electronic interactions with the sender that improve the deliverability of electronic communications from the sender to the users' electronic communication addresses. Electronic communications, such as emails, text messages and instant messages, are sent from an electronic communication sender to a user using an electronic communication receiver, through a network, such as the Internet. The network includes an electronic communication evaluator that rates the sender based on the ongoing electronic interactions. Additionally, the protected electronic content may be monetized by charging third-party advertisers for the electronic interactions.

15 Claims, 4 Drawing Sheets

SYSTEM AND METHOD OF IMPROVING THE DELIVERABILITY OF ELECTRONIC COMMUNICATIONS

TECHNICAL FIELD

The present invention relates to systems and methods that improve the deliverability of electronic communications. More specifically, the present invention relates to building, maintaining, and scoring lists of electronic communication addresses of users by providing users with ongoing access to protected electronic content in exchange for the users engaging in ongoing electronic interactions with the sender that improve the deliverability of electronic communications from the sender to the users' electronic communication addresses.

BACKGROUND

Deliverability is a key metric for people and companies that send a large volume of electronic communications, such as email. In the case of email, for instance, deliveries delayed, sent to "junk" or "spam" folders or completely rejected because the receiving email server has flagged or blocked the sending mail server can cause significant problems and expense for email senders. The reputation of a sending email server is a key component that determines whether email from the sending email server will be allowed to be delivered at all, delivered on time, or delivered as "junk," "spam," or the like. Receiving email servers typically keep track of all email and where it comes from, and whether recipients open the email, click on links in the email, treat it as unwanted by, for example, marking it as "junk" or "spam", or mark it as "not junk" or "not spam" in the event it is delivered to the recipient's "junk" or "spam" folder. Mail sending servers that establish a poor reputation for sending unsolicited and unwanted email may be flagged or blocked, which prevents future email from being delivered to the recipients' "inboxes," delivered with images displayed, delivered on time, or delivered at all. It is known that email recipients or end-users are much more likely to respond positively to an email solicitation if that email is timely sent to the user's inbox with all content automatically displayed should the user so desire. Accordingly, it is critical for companies and people interested in delivering email effectively that they maintain a good reputation for their email-sending servers. If proper care is not taken to establish, maintain and protect a sender's good reputation, it may become difficult to send email to email-receiving servers, leading to lower conversion rates for solicitations, lower revenues and lower profits.

The reputations of email-sending servers are typically determined by an objective reputation score. The reputation score is typically a metric that measures the value of the email to the end user. Email-receiving servers typically determine the reputation score of email-sending servers dynamically; every individual email message from a single email-sending server is analyzed, and each subsequent piece of mail delivered from the same server impacts the reputation score for the server. It is possible for an email-sending server to establish a good reputation for a period of time and then start sending email that is flagged by the receiving server as inappropriate, which lowers the sending server's reputation score. Once a reputation score goes down and deliverability restricted, it is typically difficult to bring it back up again, since less email will be allowed in from the sending server.

Therefore, it is imperative that email-sending servers and other senders of electronic communications build and maintain their reputations to maximize the deliverability of their communications by minimizing the number of electronic communications sent to recipients that fail to interact with them or otherwise indicate that they are unwanted.

SUMMARY

Accordingly, provided herein are various systems and methods to improve the deliverability of electronic communications, including but not limited to systems and methods for building and maintaining lists of electronic communication addresses of users by providing users with ongoing access to protected electronic content in exchange for the users engaging in ongoing electronic interactions with the sender that improve the deliverability of electronic communications from the sender to the users' electronic communication addresses.

Provided in certain example embodiments is a method of improving the deliverability of electronic communications from an electronic communication sender to a user using an electronic communication receiver, comprising in certain example embodiments any or all of the steps of: sending from the electronic communication sender to the electronic communication receiver a first electronic communication comprising a first request that the user perform one or more electronic interactions with the electronic communication; providing the user with access to electronic content in exchange for the first requested electronic interactions having been engaged in; continuing to send from the electronic communication sender to the electronic communication receiver one or more subsequent electronic communications comprising one or more additional requests that the user perform one or more additional electronic interactions with the corresponding one or more subsequent electronic communications; and continuing to provide the user with access to the electronic content in exchange for each additional requested electronic interaction having been engaged in; wherein the activity of engaging in the requested electronic interactions increases the deliverability of subsequent electronic communications from the electronic communication sender to the electronic communication receiver.

Various example embodiments may further comprise the step of: evaluating the response of the electronic communication receiver to the electronic communications sent from the electronic communication sender to the electronic communication receiver through the network, and that step may further comprise affecting the deliverability of electronic communications subsequently sent from the electronic communication sender to the electronic communication receiver based on the response of the electronic communication receiver to the electronic communications received from the electronic communication sender.

Additional example embodiments may further comprise any or all of the steps of: blocking the user's access to the electronic content after a requested electronic interaction has not been engaged in; monetizing the electronic content by charging a third-party for the activity of engaging in the requested electronic interactions. In various example embodiments the network may comprise the Internet, and the electronic communications may comprise emails, text messages, instant messages, messages delivered through a social network, and/or messages delivered to an application on an electronic device. Other example embodiments have the method determining a user interactivity score upon which the level of access may be based.

In order to carry out these steps and others, provided in certain example embodiments is a system adapted to improve the deliverability of electronic communications from an electronic communication sender to a user using an electronic communication receiver, comprising in certain example embodiments any or all of: an electronic content provider; an electronic communication sender; a network; an electronic communication evaluator; and the electronic communication receiver; wherein: the electronic content provider is in electronic communication with the network and is adapted to switchably provide and not provide electronic content to the electronic communication receiver through the network; the electronic communication sender is in electronic communication with the network and is adapted to send electronic communications from the electronic communication sender to the electronic communication receiver through the network; the electronic communication receiver is in electronic communication with the network and is adapted to receive the electronic communications sent from the electronic communication sender to the electronic communication receiver through the network; the electronic communication evaluator is in electronic communication with the network and is adapted to evaluate the response of the electronic communication receiver to the electronic communications sent from the electronic communication sender to the electronic communication receiver through the network, and to affect the deliverability of electronic communications subsequently sent from the electronic communication sender to the electronic communication receiver based on the response of the electronic communication receiver to the electronic communications received from the electronic communication sender; and the electronic communication sender is further adapted to send from the electronic communication sender to the electronic communication receiver a first electronic communication comprising a first request that the user perform one or more electronic interactions with the electronic communication; the electronic content provider is further adapted to provide the user with access to electronic content in exchange for the first requested electronic interactions having been engaged in; the electronic communication sender is further adapted to continue to send from the electronic communication sender to the electronic communication receiver one or more subsequent electronic communications comprising one or more additional requests that the user perform one or more additional electronic interactions with the corresponding one or more subsequent electronic communications; the electronic content provider is further adapted to continue to provide the user with access to the electronic content in exchange for the additional requested electronic interactions being engaged in; and the electronic communication evaluator is further adapted to increase the deliverability of subsequent electronic communications sent from the electronic communication sender to the electronic communication receiver in response to the requested electronic interactions having been engaged in.

In various example systems, electronic content provider may be further adapted to block/discontinue/modify the user's access to the electronic content after a requested electronic interaction has not been engaged in, and/or further adapted to charge a third-party for the activity of engaging in the requested electronic interactions. In various example embodiments of the system the electronic communication sender and the electronic content provider may be separate sub-systems that communicate with each other through the network, or the electronic communication sender and the electronic content provider may both be part of the same sub-system.

Various optimization routines are also provided and described herein.

Other aspects of the invention are disclosed herein as discussed in the following Drawings and Detailed Description.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate like parts or steps throughout the different views. It will be understood that various components, steps and details may not appear in the figures to assist in more clearly describing the invention. Likewise, for ease of understanding one thing or step may be shown in the figures to illustrate a concept, where many of such things or steps may be employed in various applications.

DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

Figure 1A:
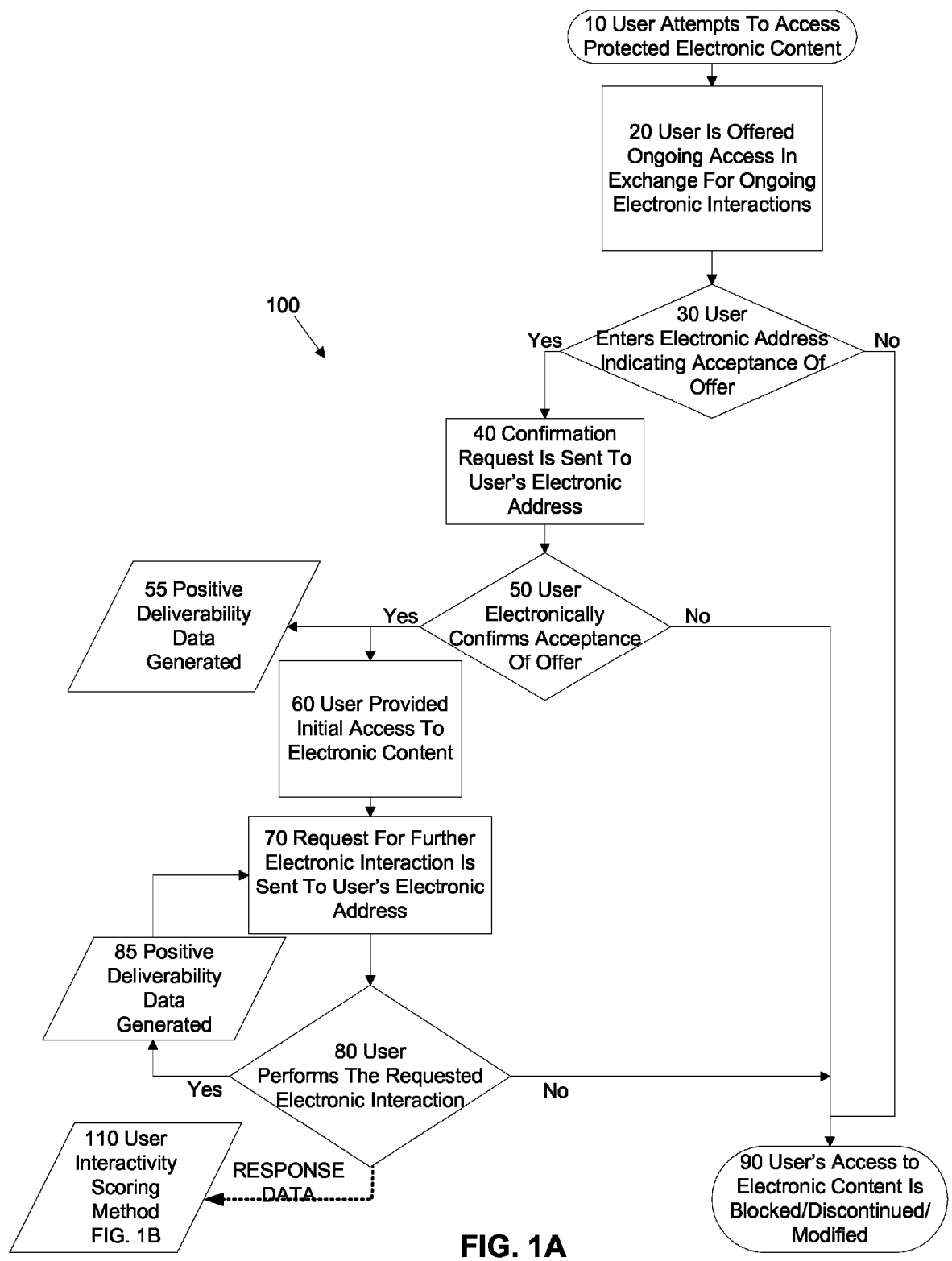
FIG. 1A is a flow diagram of a method in accordance with various example embodiments of the invention.
Figure 2:
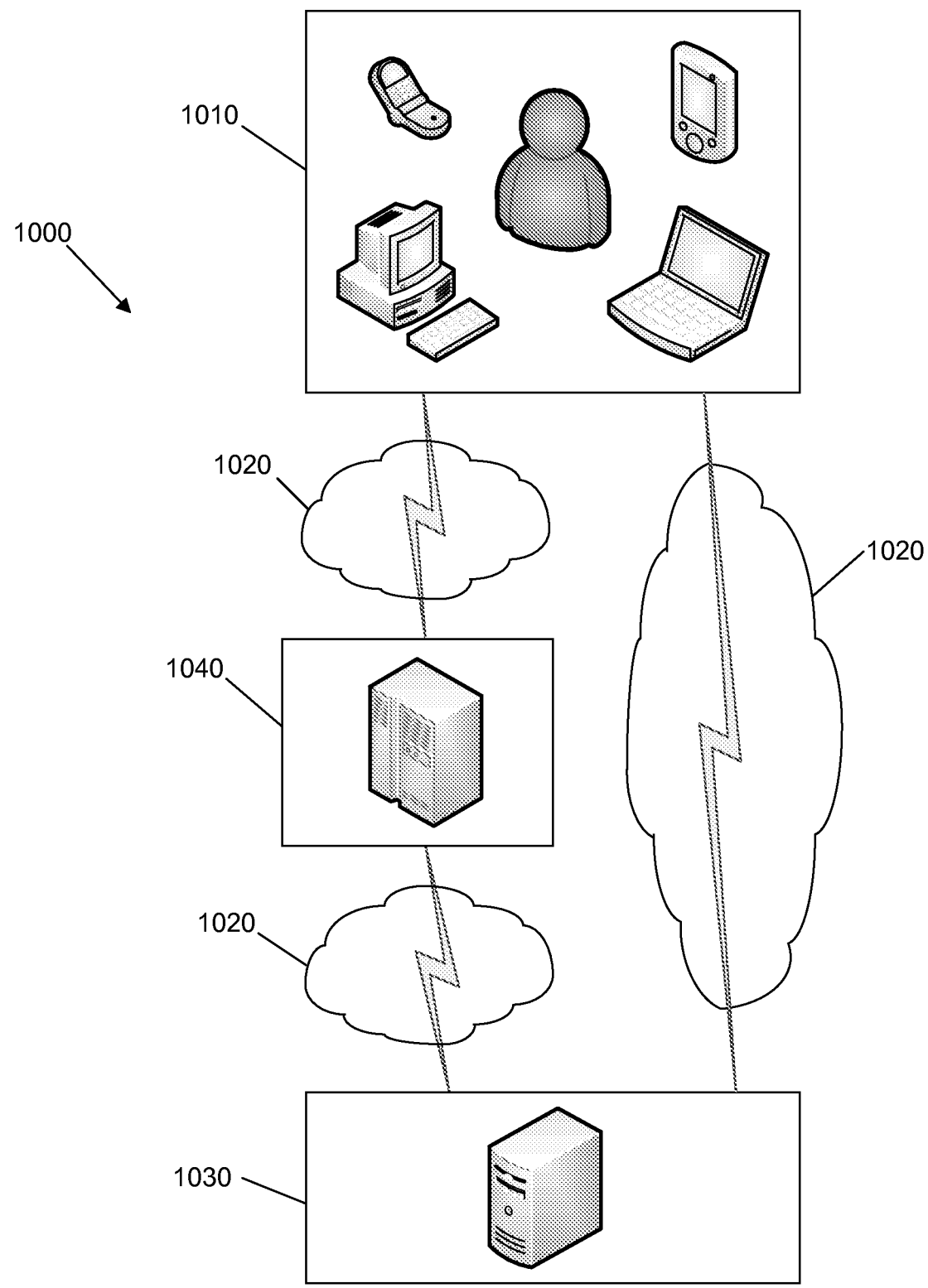
FIG. 2 is a block diagram of a system in accordance with various example embodiments of the invention, showing example hardware.
Figure 3:
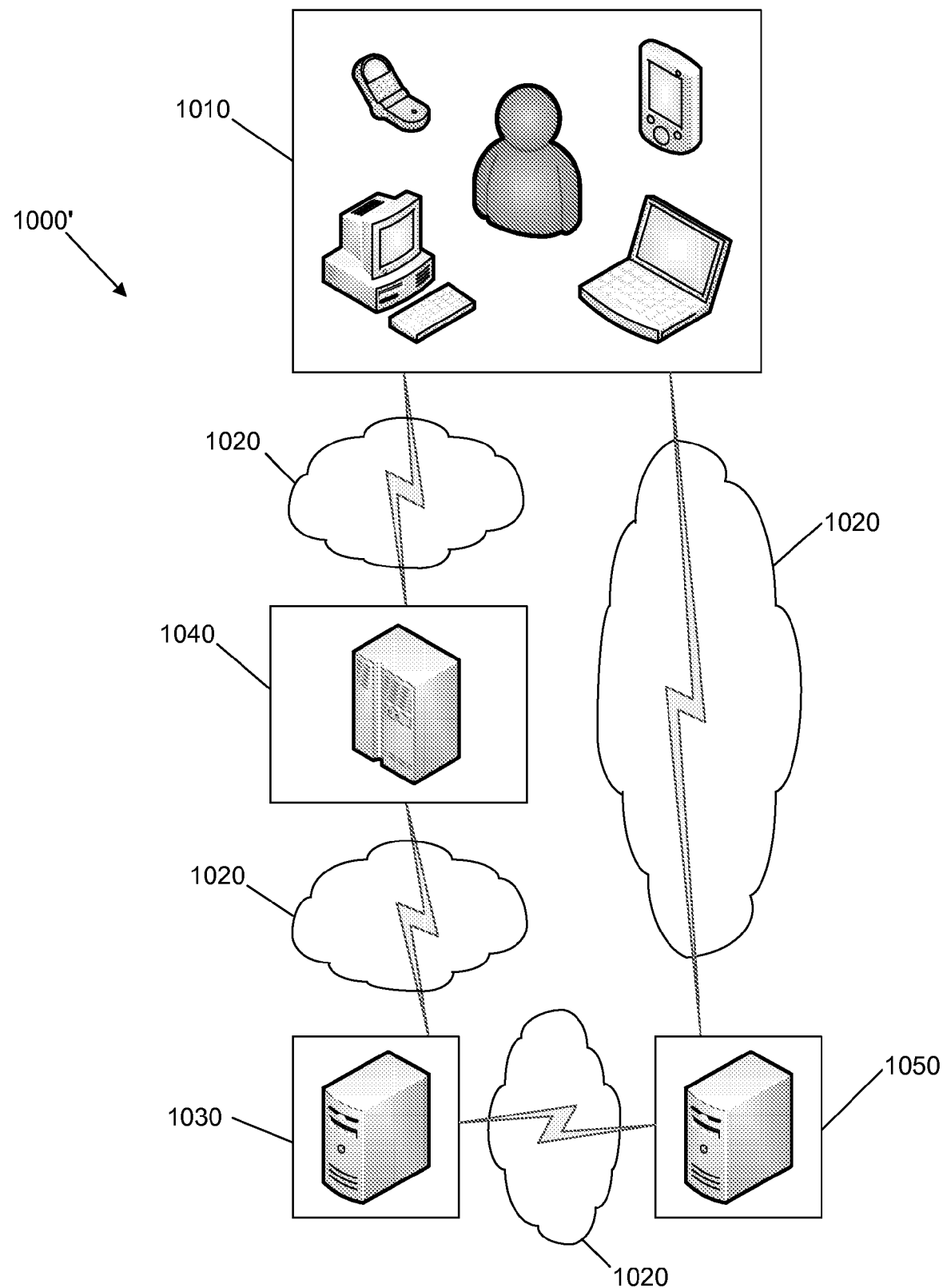
FIG. 3 is a modified block diagram of the system shown in FIG. 2, in accordance with alternative example embodiments of the invention, showing example hardware.

Certain example steps 100 are illustrated in FIG. 1A that may be employed in various example systems, such as systems 1000, 1000' shown in FIGS. 2 and 3. Beginning with step 10, a user 1010 (one or more persons using one or more electronic communication devices, such as a smart phone, computer, etc.) may attempt to access certain electronic content that may be protected and thus inaccessible to the user 1010. For example, a user 1010 may use an electronic device such as a smart phone, computer, or any other appropriate device to attempt to access electronic content that is located on that and/or one or more other electronic devices, such as data, information, document(s), one or more web pages, website(s), newsletter(s), group(s), or any other electronic content, for instance premium content on or through the Internet 1020 or another network.

In the present systems and methods the requested electronic content is not freely available without restriction to the user 1010. But instead of or in addition to offering access to the electronic content in exchange for a monetary payment, at step 20 the user 1010 may be presented with a different kind of offer: ongoing access to the electronic content in exchange for the user 1010 participating in ongoing electronic interactions that may be requested from time to time (such as, for instance, at steps 70, 80). For example, at step 20 the user 1010 may be presented with a web page or other electronic communication that explains various terms and conditions to which the user 1010 must agree in order to be provided access to the protected electronic content. The ongoing electronic interactions proposed at step 20 can be any suitable interactions, including but not limited to, for instance, receiving, opening, and interacting with electronic communications sent from a communication sender 1030 to an electronic communication address provided by the user 1010. Communication sender 1030 may comprise one or more servers or other computing hardware running appropriate software and in electronic communication with a network 1020, such as an email sending server. Interacting with such electronic communications can in various embodiments include any or all of opening it, answering or responding to it, moving it, marking it as "not spam," "not junk," or otherwise "safe," clicking on a "show images" or similar button to makes images in the communication appear, clicking on links embedded in the communication, performing tasks requested by the communication, or otherwise interacting with communication in a positive manner. Other proposed electronic interactions described to the user 1010 at step 20 can include such activities as participating in a survey, rating something, providing information about the user, or opinions or preferences of the user, or otherwise providing data or other information, as requested in subsequent electronic communications sent from a communication sender 1030 to the user 1010 at the electronic communication address provided by the user 1010. In various example embodiments at step 20 the user 1010 can select from a variety of different proposed electronic interactions that, when completed by the user 1010 on an ongoing basis, will provide the user 1010 with ongoing access to the protected electronic content.

In step 30 of the example embodiment 100 shown in FIG. 1A, the user 1010 may indicate their agreement to the terms and conditions or other offer communicated to the user 1010 in step 20 by entering or otherwise submitting their electronic communication address through an electronic interface provided at steps 20 and/or 30. For example, in various example embodiments in step 20 the user 1010 may be presented with a field to input their email address, or telephone number (for instance for texting electronic communications). Similarly, in various example embodiments the address can be for an Instant Messaging (IM) account, a social networking account, an application running on an electronic device, or any other suitable electronic communication address. In any of those embodiments, in step 30 the user 1010 may enter or otherwise communicate their email address, telephone number, or other electronic communication address in the field(s) or other manner provided, and cause this data to be submitted, for instance through the Internet "cloud," or other network 1020 to the communication sender 1030.

Also at step 30, if the user 1010 does not provide their electronic communication address as requested, then the user is not granted access to the protected content; i.e., the user's access to the electronic content becomes or remains blocked, as indicated at step 90. In various embodiments when the user attempts to navigate away from or otherwise not accept the request, invitation or offer presented at steps 20 and/or 30, the system and method may present the user 1010 with a new offer acceptance interfaces 20' and/or 30' (not shown), which may provide different and/or potentially more attractive terms. This loop may be repeated more than once. Additionally, differing offer acceptance interfaces 20, 20', 20", etc., and/or 30, 30', 30", etc., may be simultaneously and/or sequentially presented to any number of users 1010, and the performance of each interface measured and compared. In these embodiments, interfaces 20 and/or 30 that are accepted more often by users 1010 may replace or modify interfaces 20 and/or 30 that are accepted less often by users 1010 to optimize the process.

Turning to step 40, where the user 1010 does indicate acceptance of the offer presented at step 20 by entering or otherwise submitting their electronic communication address at step 30, a confirmation request is sent to the electronic communication address provided by the user 1010. In various example embodiments this may be accomplished by the user 1010 causing their electronic communication address to be electronically communicated from the user 1010 to a communication sender 1030, for instance through the Internet "cloud," or other network 1020, where the communication sender 1030 then responds by generating and electronically communicating a confirmation request back through the network 1020 to the user 1010 at the electronic communication address provided by the user 1010. Typically, the confirmation request that travels from the communication sender 1030 to the user 1010 travels through or is monitored by an electronic communication evaluator 1040, as shown in FIGS. 2 and 3. In various example embodiments the electronic communication evaluator 1040 may comprise one or more servers or other computing hardware running appropriate software and in electronic communication with a network 1020, such as email servers, and may be part of an Internet Service Provider (ISP). The confirmation request itself is typically some form of electronic communication that the recipient (user 1010) can interact with to confirm that the electronic communication address provided by the user 1010 is valid. For instance, in various example embodiments the confirmation request may be an email including a link and instructions for the user 1010 to click the link to confirm acceptance of the offer provided at step 20 or to otherwise continue the process of obtaining access to the protected electronic content.

At step 50 the user 1010 electronically confirms acceptance of the offer initially presented, suggested, or otherwise identified at step 20. Positive acceptance by the user 1010 at steps 30 through 50 constitutes a "double opt-in" procedure. In various example embodiments the user 1010 may electronically confirm acceptance of the offer by interacting with the confirmation request sent at step 40, or by interacting with one or more other interfaces provided to the user 1010 upon the user's positive interaction with the confirmation request sent at step 40. For example, in various example embodiments the user 1010 may click on a link provided in an email sent at step 40 that brings up a web page optionally with information such as detailed terms and conditions and explanations of the system. Such a web page or other electronic interface may also include fields or other means for the user 1010 to enter additional information such as information regarding the user 1010. For example, at step 50 in various example embodiments the user may be asked to create an account by inputting information such as, among other things, a username and password. At step 50 then, the user 1010 enters the additional information required, if any, and otherwise interacts with the electronic interface provided to indicate confirmation of acceptance of the offer for ongoing access to the protected content in exchange for ongoing electronic interactions.

Also at step 50, if the user 1010 does not interact with the interface to indicate acceptance of the offer as requested, then the user is not granted access to the protected content; i.e., the user's access to the electronic content becomes or remains blocked, as indicated at step 90. In various embodiments when the user attempts to navigate away from or otherwise not accept the request, invitation or offer presented at steps 40 and/or 50, the system and method may present the user 1010 with a new offer acceptance interfaces 40' and/or 50' (not shown), which may provide different and/or potentially more attractive terms. This loop may be repeated more than once. Additionally, differing offer acceptance interfaces 40, 40', 40", etc., and/or 50, 50', 50", etc., may be simultaneously and/or sequentially presented to any number of users 1010, and the performance of each interface measured and compared. In these embodiments, interfaces 40 and/or 50 that are accepted more often by users 1010 may replace or modify interfaces 40 and/or 50 that are accepted less often by users 1010 to optimize the process.

At step 55, the user's "double opt-in" affirmative acceptance of the offer at step 50 generates positive deliverability data regarding electronic communications sent from the communication sender 1030 to the electronic communication address provided by the user 1010. This positive deliverability data may in various example embodiments be generated by, delivered to, measured and/or stored by communication evaluator 1040, such as, for example, the user's email provider or ISP. This positive deliverability data tends to raise the reputation score of the communication sender 1030, and increase the likelihood that future electronic communications sent from the communication sender 1030 to the electronic communication address provided by the user 1010 will be delivered, will be delivered on time, will be delivered not as "junk," "spam," or the like, and will be delivered with images automatically displayed. Systems and methods for monitoring the deliverability data of electronic communications such as email are known in the art and expressly incorporated herein by reference in their entireties, including: United States Patent Application Publication Number US 2008/0320093 A1 to Thorne, entitled "Controlling The Sending Of Electronic Mail," filed Jun. 20, 2008 and assigned to Goolara, LLC of Alameda, Calif. ("Thorne"). While Thorne discusses certain specific ways of measuring the deliverability of electronic mail, features of which may be used in connection with the present invention as will be apparent to persons of skill in the art, Thorne did not teach, suggest or otherwise rendered obvious the present system and method of improving the deliverability of electronic communications.

Turning to step 60, where the user 1010 does confirm acceptance of the offer at step 50, the user 1010 is provided with initial access to the protected electronic content. For example, in certain example embodiments a username and/or password provided by or provided to the user 1010 in connection with confirmation of acceptance at step 50 may be activated to provide access to the protected electronic content. In those examples the user 1010 may navigate or be automatically directed to the location of the protected electronic content, enter or otherwise communicate the user's username, password, or other indication of acceptance of the terms or membership in the system, and thereby be provided with access to the protected electronic content. The protected electronic content may be stored in any location. In various example embodiments the protected electronic content may be stored at least in part at the location of the user 1010 (on one of the user's electronic devices). In various example embodiments the protected electronic content may be stored at least in part at the same location as the communication sender 1030, as represented in system 1000 shown in FIG. 2. In various example embodiments the protected electronic content may be stored at least in part at a location different than the communication sender 1030, such as separate content provider 1050 as shown in system 1000' in FIG. 3. In various example embodiments the separate content provider 1050 may comprise one or more servers or other computing hardware running appropriate software and in electronic communication with a network 1020, such as a website hosting server. In these later embodiments (such as system 1000'), the separate content provider 1050 may contract with, hire, or otherwise obtain the services of communication sender 1030 in order to outsource the creation of a list of electronic communication addresses with high deliverability for customers interested in the protected electronic content provided by the separate content provider 1050.

In any of the foregoing embodiments, the protected electronic content may also be monetized at least in part by the communication sender 1030 or separate content provider 1050 charging advertisers or data seekers who are willing to pay for the ongoing electronic interactions (e.g., steps 70, 80, 85) engaged in by the user 1010, which interactions may include viewing or interacting with advertisements and/or providing consumer or other data. Other systems and methods for monetizing electronic content accessed by a user 1010 by charging advertisers or data seekers for electronic interactions engaged in by users 1010 are known in the art and expressly incorporated herein by reference in their entireties, including: U.S. Pat. No. 5,794,210 to Goldhaber, et al., entitled "Attention Brokerage," filed Dec. 11, 1995, issued Aug. 11, 1998 and assigned to CyberGold, Inc. of Berkeley, Calif. ("Goldhaber"); and U.S. Pat. No. 7,346,545 B2 to Jones, entitled "Method And System For Payment Of Intellectual Property Royalties By Interposed Sponsor On Behalf Of Consumer Over A Telecommunications Network," filed May 29, 2001 and issued Mar. 18, 2008 and assigned to Ultramercial, Inc. of Palo Verdes, Calif. ("Jones"). While Jones and Goldhaber discuss certain specific ways of monetizing a user's electronic interactions, features of which may be used in connection with the present invention as will be apparent to persons of skill in the art, neither Jones nor Goldhaber taught, suggested or otherwise rendered obvious the present system and method of improving the deliverability of electronic communications.

In accordance with the offer accepted by the user 1010 (which in various example embodiments may be accepted passively simply by continuously or regularly engaging in the requested electronic interactions, during which time access to the protected electronic content may be provided), at step 70 a request for further electronic interaction is sent to the electronic communication address provided by the user 1010. The ongoing electronic interactions requested at step 70 can be any suitable interactions, including but not limited to, for instance, receiving, opening, and interacting with electronic communications sent from a communication sender 1030 to an electronic communication address provided by the user 1010. Interacting with such electronic communications can in various embodiments include any or all of opening it, answering or responding to it, moving it, marking it as "not spam," "not junk," or otherwise "safe," clicking on a "show images" or similar button to makes images in the communication appear, clicking on links embedded in the communication, performing tasks requested by the communication, or otherwise interacting with communication in a positive manner, for instance as requested in the communication step 70. Other electronic interactions that may be requested of the user 1010 at step 70 can include such activities as participating in a survey, rating something, providing information about the user, or opinions or preferences of the user, or otherwise providing data or other information, as requested in subsequent electronic communications sent from a communication sender 1030 to the user 1010 at the electronic communication address provided by the user 1010. In various example embodiments at step 70 the user 1010 can select from a variety of different proposed electronic interactions that will provide the user 1010 with access to the protected electronic content for a further period of time, which may or may not be predetermined or agreed to in advance.

In various example embodiments communication step 70 may be accomplished by the communication sender 1030 sending an electronic communication to the electronic communication address provided by the user 1010, for instance through the Internet "cloud," or other network 1020. Typically, the request that travels from the communication sender 1030 to the user 1010 travels through or is monitored by an electronic communication evaluator 1040, as shown in FIGS. 2 and 3 and discussed previously. The request itself is typically some form of electronic communication that the recipient (user 1010) can interact with as requested in the electronic communication itself. For instance, in various example embodiments the request may be an email including a link and instructions for the user 1010 to click the link to perform the electronic interaction to obtain continuing access to the protected electronic content.

At step 80 the user 1010 performs the electronic activity requested at step 70 and maintains access to the protected electronic content, or alternatively the user 1010 does not perform the activity requested at step 70, in which case the user's access to the electronic content is switched and becomes blocked, as indicated at step 90. In various embodiments when the user attempts to navigate away from or otherwise not accept the request presented at step 70, the system and method may present the user 1010 with a new request 70' (not shown), which may be different and/or potentially more attractive for the user 1010 to perform. This loop may be repeated more than once. Additionally, differing requests 70, 70', 70", etc., may be simultaneously and/or sequentially presented to any number of users 1010, and the performance of each request measured and compared. In these embodiments, requested actions 70 that are performed more often by users 1010 may replace or modify requested actions 70 that are performed less often by users 1010 to optimize the process.

At step 85, the user's performance of the requested electronic interaction at step 80 generates positive deliverability data regarding electronic communications sent from the communication sender 1030 to the electronic communication address provided by the user 1010. This positive deliverability data may in various example embodiments be generated by, delivered to, measured and/or stored by communication evaluator 1040, such as, for example, the user's email provider or ISP. This positive deliverability data tends to raise the reputation score of the communication sender 1030, and increase the likelihood that future electronic communications sent from the communication sender 1030 to the electronic communication address provided by the user 1010 will be delivered, will be delivered on time, will be delivered not as "junk," "spam," or the like, and will be delivered with images automatically displayed, as discussed above with respect to step 55.

Steps 70, 80, and 85 are then periodically repeated, over and over, at intervals that are predetermined or non-predetermined, agreed or non-agreed, until, in various example embodiments: the user 1010 stops performing the requested interactions (in which case the process 100 goes to step 90 and the content provider switches-off the user's access to the protected electronic content, for instance by deactivating the password, username or the like of the user 1010); or the communication sender 1030 stops sending requests 70; and/or the content provider (such as separate content provider 1050) stops protecting or removes the content, or takes any other action that stops the process 100.

Figure 1B:
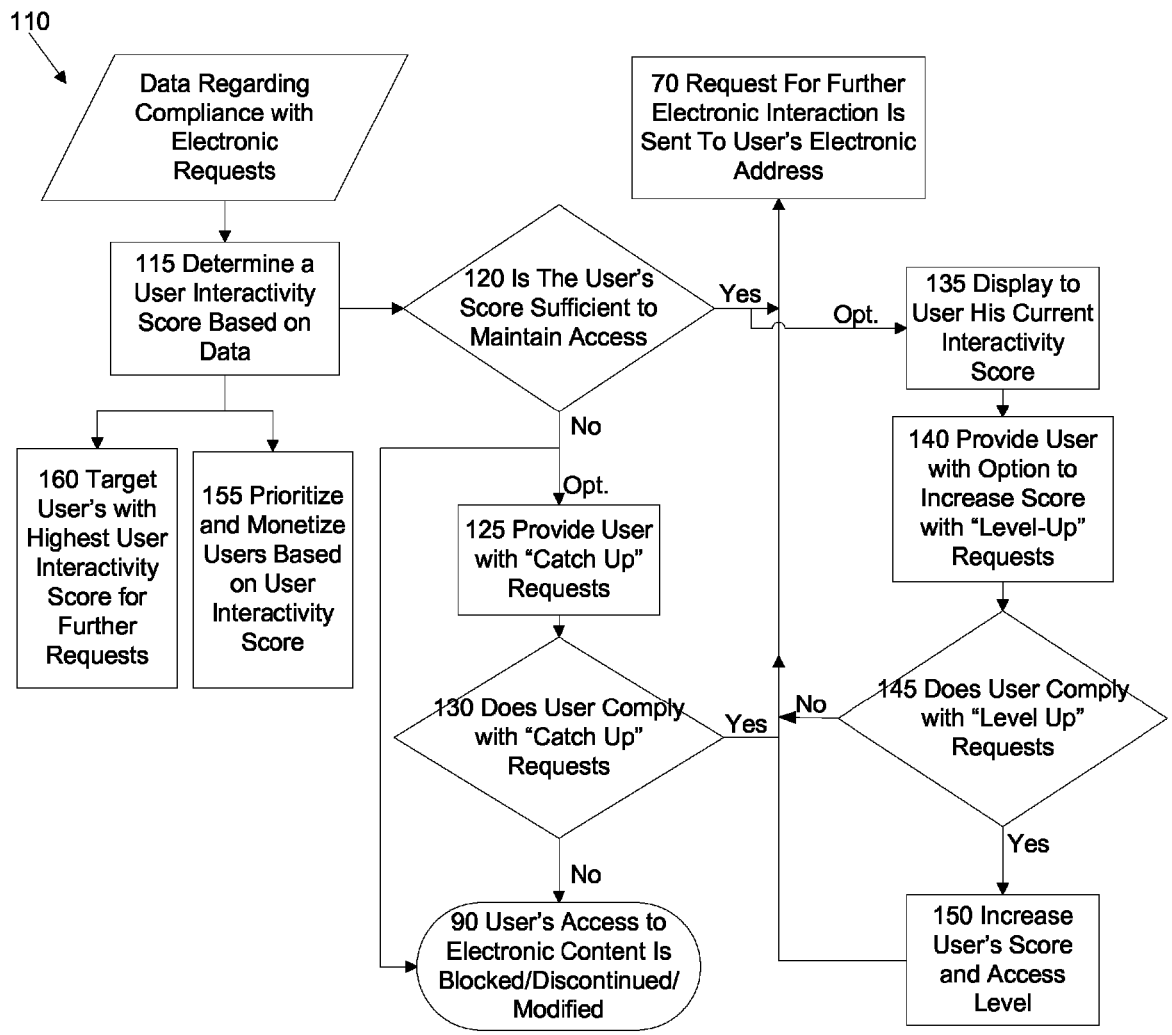
FIG. 1B is a flow diagram of a user interactive scoring method in accordance with various example embodiments of the invention.

FIG. 1B illustrates a user interactive scoring method 110 that can be used to determine the level of access the user may have to the restrictive content. As the user receives requests to engage in electronic interaction (i.e., step 70, FIG. 1A), the results from decision block 80 are recorded for each user. The information that may be recorded includes the amount of compliance to a particular request, the time it took to comply with the request, the time at which the user complied, the type of request responded to, the subject of the request, etc. As one might expect, some users will be very engaged in the requested interaction and may have a 100% compliance and may comply very quickly, while other may be very disengaged with correspondingly low compliance percentage. By recording this data, a user interactivity score may be determined for each user at step 115, and that score can be used for several purposes. This interactivity score can be refined with an interactivity score for a particular type of request or the subject of the request. For example, a particular user may have a very high interactivity score for sports related requests, and not as high for other topics. Or, the user may be particularly compliant with survey requests. The user may also have a high interactivity score in the early evening. By constructing a multifaceted interactivity score, the requests can be more individually tailored.

First, it may provide a useful metric on which to base the amount of restricted content to be offered to the user. In one example, there may be three tiers of restricted content access: gold, silver and bronze. In this example, gold would require 90 percentile interactivity score, silver 80% and bronze 70%, with gold allowing access to the most amount of restricted content, silver with less access and bronze the least access. Below the bronze level, the user's access may be completely discontinued. It would be apparent, that more tiers could be used to further refine the amount of content to be offered. Referring to FIG. 1B, the method determines whether the user has a sufficient score to maintain access at step 120 (this could include maintaining access at the current level). If so, then the method continues to step 70 (FIG. 1A) and requests for further electronic interaction are sent to the user. If the method at step 120 determines that the user has not maintained a sufficient user interactivity score, then the user's access to electronic content is blocked/discontinued/modified in step 90 (FIG. 1A). However, even when a user's interactivity falls below a threshold level, say for example below the bronze level, it may be useful to offer the user an opportunity to "catch-up" for the past non-compliance with a series of electronic requests that must be performed to maintain in good standing to continue access to the restricted content. For example, a particular user may have been delinquent in responding to several electronic request, dropping his user interactivity score to below that of a bronze tier. The method may then offer the user the chance to act on several requests to reestablish his interactivity score at steps 125 and 130. If the user complies with the "catch-up" requests then his access is re-established and the method continues to step 70 (FIG. 1A) and requests for further electronic interaction are sent to the user.

Second, the user interactivity score may be used to prioritize the value of the various end users at step 155. Users that have a high interactivity score are those that will not only receive emails, but will also act on those emails and possibly act on those emails quickly. This is important because it is these users that can help catapult a reputation score more quickly with the ISPs. Therefore, the method may target those users with the highest interactivity scores to increase the reputation score, as shown in step 160. Also, these high interactivity score users are most valuable to email list monetization because they are proven to be responsive. For example, a list of a thousand gold level users would likely be more valuable than a similar list of bronze level users. As with the level of service above, the number of tiers in which the users may be prioritized and, subsequently monetized may be several.

Third, the user interactivity score may be used to entice user's to increase or "level-up" their compliance. For example, a bronze level user may be shown his score after each instance where he performs/fails to perform the requested interaction at step 135. Along with that score, the user may be informed that by complying with the next several interaction requests (step 140), the user would be bumped to the next tier of content access—i.e, silver. This would tend to incentivize users to maximize their user interactivity score thus reaching the highest possible tier of content. If the user complies with the "level-up" requests then his access level is increased at step 150 and the method continues to step 70 (FIG. 1A) and requests for further electronic interaction are sent to the user. And with higher user interactivity scores, the reputation score can more quickly rise, and the more valuable the email list becomes.

While example systems 1000 and 1000' are shown in FIGS. 2 and 3 and have been described herein with reference to example system and method 100, these systems and method steps are provided as simple examples to illustrate the broader concepts. As will be apparent to persons skilled in the art, modifications and adaptations to the above-described invention can be made without departing from the spirit and scope of the invention, which is defined only by the following claims.

What is claimed is:

1. A method of improving the deliverability of electronic communications from an electronic communication sender to a plurality of users each using one of a plurality of electronic communication receivers, comprising the steps of:
    (a) sending from the electronic communication sender to the plurality of electronic communication receivers a first electronic communication comprising a first request that the plurality of users perform one or more electronic interactions with the electronic communication;
    (b) providing the plurality of users with access to electronic content in exchange for the first requested electronic interactions having been engaged in;
    (c) continuing to send from the electronic communication sender to the plurality of electronic communication receivers one or more subsequent electronic communications comprising one or more additional requests that the plurality of users perform one or more additional electronic interactions with the corresponding one or more subsequent electronic communications;
    (d) continuing to provide the plurality of users with access to the electronic content in exchange for each additional requested electronic interaction having been engaged in;
    (e) calculating an interactivity score for each of the plurality of users based on each user's compliance with the requests contained in steps (a) and (c);
    (f) increasing the deliverability of subsequent electronic communications from the electronic communication sender to plurality of the electronic communication receivers based on the interactivity scores;
    (g) ranking each user in the plurality based on the interactivity scores;
    (h) narrowing the plurality of users to which subsequent electronic communications are sent to those users in the plurality that meet a threshold interactivity score;
    (i) setting the threshold interactivity score to optimize a reputation score of the electronic communications sender;
    (j) affecting the deliverability of electronic communications subsequently sent from the electronic communication sender to the plurality of electronic communication receivers based on the responses of the plurality of electronic communication receivers to the electronic communications received from the electronic communication sender.

2. The method of claim 1, further comprising the step of: modifying electronic communications subsequently sent from the electronic communication sender to the plurality of electronic communication receivers based on the interactivity scores.

3. The method of claim 2, further comprising the step of: modifying the access of each the plurality of users to the electronic content based on the interactivity scores.

4. The method of claim 2, further comprising the step of: targeting the plurality of electronic communication receivers based on the interactivity scores.

5. The method of claim 2, further comprising the step of:
    sending "catch-up" electronic communications comprising one or more additional requests to at least one user in the plurality that the user perform one or more additional electronic interactions with the corresponding one or more subsequent electronic communications; and
    increasing the interactivity score of the at least one user in the plurality based on whether the based on the response of the electronic communication receiver to the "catch-up" electronic communications received from the electronic communication sender.

6. The method of claim 1, further comprising the step of: monetizing the electronic content by charging a third-party for the activity of engaging in the requested electronic interactions.

7. The method of claim 1, wherein the network comprises the Internet.

8. The method of claim 1, wherein the electronic communications is selected from a group consisting of: emails, text messages, instant messages, messages delivered through a social network, and messages delivered to an application running on an electronic device.

9. A system adapted to improve the deliverability of electronic communications from an electronic communication sender to a plurality of users each using one of a plurality of electronic communication receivers, comprising: an electronic content provider; an electronic communication sender; a network; an electronic communication evaluator; and the plurality of electronic communication receivers; wherein:
    the electronic content provider is in electronic communication with the network and is adapted to provide electronic content to the plurality of electronic communication receivers through the network;
    the electronic communication sender is in electronic communication with the network and is adapted to send electronic communications from the electronic communication sender to the plurality of electronic communication receivers through the network;
    the plurality of electronic communication receivers is in electronic communication with the network and is adapted to receive the electronic communications sent from the electronic communication sender to the plurality of electronic communication receivers through the network;
    the electronic communication evaluator is in electronic communication with the network and is adapted to (1) evaluate the response of the plurality of electronic communication receivers to the electronic communications sent from the electronic communication sender to the plurality of electronic communication receivers through the network, and to affect the deliverability of electronic communications subsequently sent from the electronic communication sender to the plurality of electronic communication receivers based on the response of the plurality of electronic communication receivers to the electronic communications received from the electronic communication sender; and (2)

calculate the interactivity scores for each of the plurality of users based on each user's response to the one or more electronic communications requesting one or more additional electronic interactions; and the electronic communication sender is further adapted to send from the electronic communication sender to the plurality of electronic communication receivers, a first electronic communication comprising a first request that the plurality of users perform one or more electronic interactions with the first electronic communication;

the electronic content provider is further adapted to provide the plurality of users with access to electronic content in exchange for the first requested electronic interactions having been engaged in and adapted to limit the access of each of the plurality of users to the electronic content based on the interactivity scores of each of the plurality of users;

the electronic communication sender is further adapted to continue to send from the electronic communication sender to the plurality of electronic communication receivers one or more subsequent electronic communications that are based on the interactivity scores, comprising one or more additional requests that the plurality of users perform one or more additional electronic interactions with the corresponding one or more subsequent electronic communications;

the electronic content provider is further adapted to continue to provide the plurality of users with access to the electronic content in exchange for the additional requested electronic interactions being engaged in;

the electronic communication evaluator is further adapted to (1) increase the deliverability of subsequent electronic communications sent from the electronic communication sender to the plurality of electronic communication receivers in response to the requested electronic interactions having been engaged in; (2) rank each user in the plurality based on the interactivity scores and (3) determine the interactivity scores of each of a plurality of users based on the requested electronic interactions having been engaged in.

10. The system of claim 9, wherein the electronic content provider is further adapted to charge a third-party for the activity of engaging in the requested electronic interactions.

11. The system of claim 9, wherein the electronic content provider is further adapted to charge a third-party for the activity of engaging in the requested electronic interactions wherein the amount charged is based on the interactivity scores of each the plurality of users.

12. The system of claim 9, wherein the electronic communication sender and the electronic content provider are separate sub-systems that communicate with each other through the network.

13. The system of claim 9, wherein the electronic communication sender and the electronic content provider are both part of the same sub-system.

14. The system of claim 9, wherein the network comprises the Internet.

15. The system of claim 9, wherein the electronic communications is selected from a group consisting of: emails, text messages, instant messages, messages delivered through a social network, and messages delivered to an application running on an electronic device.

* * * * *